UNITED STATES PATENT OFFICE.

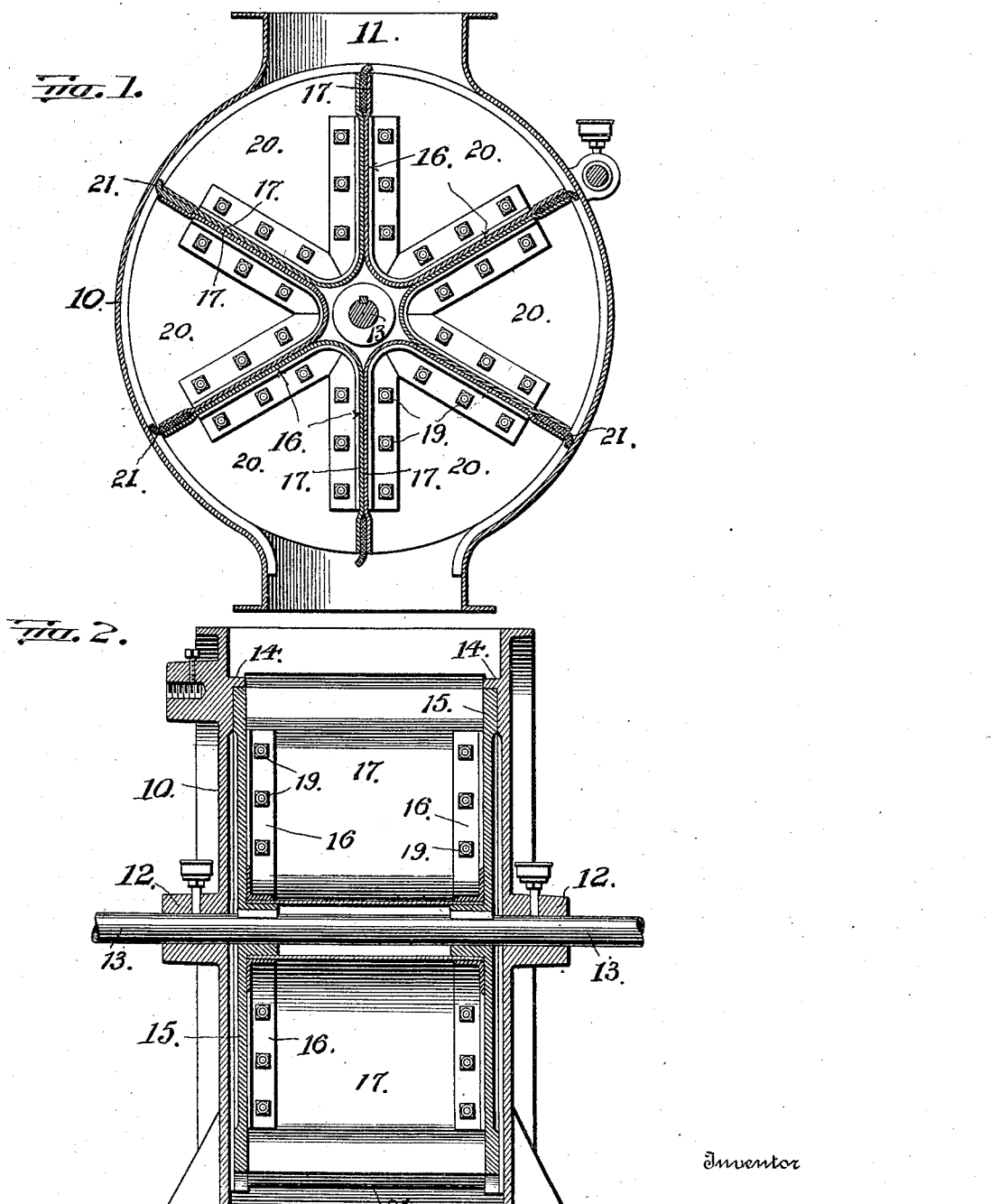

MILTON C. PETERS, OF OMAHA, NEBRASKA, ASSIGNOR TO UNITED ALFALFA CO., OF OMAHA, NEBRASKA, A CORPORATION OF NEBRASKA.

ROTARY DUST-VALVE.

1,306,276.    Specification of Letters Patent.    Patented June 10, 1919.

Application filed October 27, 1917. Serial No. 198,856.

*To all whom it may concern:*

Be it known that I, MILTON C. PETERS, a citizen of the United States, residing at Omaha, in the county of Douglas and State of Nebraska, have invented certain new and useful Improvements in Rotary Dust-Valves, of which the following is a specification.

My invention relates to a means connected with the dust discharge of a "Cyclone" or other dust collector, and it has for its essential object a simple device which will permit the dust and dust-laden air which has accumulated in the dust collector, to escape during short intervals of time without causing any pressure of air into the distributing conveyer.

With the above and other objects in view my invention consists of a dust valve and air check adapted for connection or use on the outlet of a dust collector and adapted periodically to discharge charges of dust and dust-laden air from the dust collector to a distributing conveyer.

My invention further consists of a pocketed cylinder adapted to rotate more or less slowly, the pockets of the cylinder being adapted to hold charges of dust and dust-laden air until the same can be discharged into a conveyer below.

My invention also consists of the parts and constructions, arrangements and combination of parts which I will hereinafter describe and claim.

In the accompanying drawings forming part of this specification and in which similar reference characters indicate like parts in the several views;

Figure 1 is a cross-section of a revolving dust valve or air check showing one embodiment of my invention.

Fig. 2 is a longitudinal sectional view of the same.

It is quite important in the operation of the so-called "Cyclone" or other dust collectors, and particularly those used in the cleaning of grain or feed purposes, to rid the collector of the dust and dust laden air which has accumulated therein, and in order that this result may be attained with an absence of air pressure in the distributing conveyer, which is usually associated with the dust collector, I employ a mechanism in the form of a dust valve or air check, a preferred form of which may be described as follows:

A cylindrical casing, 10, of sheet metal or other appropriate material has an inlet 11, at its top and which is designed to be bolted or otherwise secured directly to the outlet usually in the bottom of the "Cyclone" or other dust collector, said casing having a similar opening in its lower end which forms an outlet and is designed to connect with a distributing conveyer, not shown.

The sides of the casing are centrally pierced and provided with bearings, 12, for a shaft, 13, to which power may be applied in any suitable manner, the inner sides of said casing being provided with inwardly extending circumferential flanges 14.

Firmly secured to the shaft in any desired manner is the radial valve which forms a salient feature of the present invention, and which is designed to receive and successively discharge charges of dust and dust-laden air received from the outlet of the dust collector. This valve comprises side disks, 15, which fit within the flanges, 14, on the inner sides of the casing, said side disks having bolted or otherwise secured to their inner faces spaced angle irons or other brackets, 16, between which are fitted strips, 17, of rubber belting or other flexible material, although metal may be used, if desired, these strips being bent into substantially U-form and the corresponding side members of each strip being inserted between the inwardly extending flanges of the angle brackets, and being firmly connected thereto substantially throughout the length of said members, by bolts, 19, or other well known fastenings. This construction provides a number of pockets, 20, which open through the periphery of the valve and successively connect with the inlet into the valve casing.

In order to preserve a tight joint and prevent leakage of air around the circumference of this valve, I prefer to insert between the outer ends of the adjacent members of the flexible strips forming the pockets, a strip of flexible material, 21, which projects beyond the outer edge of the flexible pocket strips and is adapted to form a flap which operates in close contact with the inner circumference of the casing during the rotation of the valve to thereby form leak-tight joints between the periphery of the valve and the inner wall of the casing.

As before stated, my improved dust valve, or in other words, an air check, is designed to be used on the outlet of a "Cyclone" or other dust collector, and delivers the dust to a distributing conveyer. The pocketed cylinder which forms the valve proper is designed to be rotated very slowly and each pocket in this valve is lined with the rubber belting or other flexible strips, although rigid or semi-rigid strips may be used, if desired, said pockets being designed to pass successively beneath the inlet opening leading from the dust collector and to receive charges of dust and dust-laden air and carry the same around in the substantially air-tight compartments formed by the pockets until said pockets arrive at the lower end of the casing where the dust is then permitted to be discharged or delivered to the usual distributing conveyer. Thus, the dust or air which has accumulated in the different pockets is discharged into the outlet below as the valve revolves and is carried from there to points desired without any pressure of air in the conveyer.

Having thus described my invention what I claim as new and desire to secure by Letters Patent is:—

1. A dust valve adapted for use on the outlet of a dust collector, said valve comprising a cylindrical casing having an inlet and an outlet, and a rotary cylindrical valve in said casing having end disks, said valve having pockets adapted to register successively with the inlet and to receive charges of dust from the collector, and to successively deliver charges of collected dust to the outlet of said casing, each of said pockets being formed of a strip fashioned into substantially U-form, and means for clamping together the side edges of corresponding members of adjacent strips.

2. A dust valve adapted for use on the outlet of a dust collector, said valve comprising a cylindrical casing having an inlet and an outlet at opposite portions, and a rotary cylindrical valve in said casing having end disks, said valve having pockets adapted to register successively with the inlet and to receive charges of dust from the collector, and to successively deliver charges of collected dust to the outlet of said casing, each of said pockets being formed of a strip fashioned into substantially U-form, means on the disks for clamping together the side edges of corresponding members of adjacent strips, and a flexible strip inserted between the outer ends of adjacent strips and projecting beyond the same and adapted to operate closely against the inner wall of the casing to form a leak-tight joint therewith.

3. A dust valve adapted for use on the outlet of a dust collector, said valve comprising a casing having an inlet and an outlet, and a rotary cylindrical valve in said casing having end disks, said valve having pockets adapted to register successively with the inlet and to receive charges of dust from the collector, and to successively deliver charges of collected dust to the outlet of said casing, each of said pockets being formed of a strip fashioned into substantially U-form, means for clamping together the side edges of corresponding members of adjacent strips, a flexible strip inserted between the outer ends of adjacent strips and projecting beyond the same and adapted to operate closely against the inner wall of the casing to form a leak-tight joint therewith, said clamping means consisting of pairs of spaced brackets fixed to the inner faces of the disks having inwardly extending flanges between which the side edges of the strips are inserted, and fastenings passing through said flanges and strips.

In testimony whereof I affix my signature.

MILTON C. PETERS.